United States Patent
von Lewis

[11] 3,829,060
[45] Aug. 13, 1974

[54] MAGNET VALVE

[75] Inventor: Alexander von Lëwis, Menar, Mauren, Germany

[73] Assignee: Robert Bosch GmbH, Stuttgart, Germany

[22] Filed: Feb. 8, 1973

[21] Appl. No.: 330,515

[30] Foreign Application Priority Data
Feb. 22, 1972 Germany............................ 2208183

[52] U.S. Cl. ............................................. 251/129
[51] Int. Cl. ............................................ F16k 31/06
[58] Field of Search ............. 251/86, 120, 129, 210

[56] References Cited
UNITED STATES PATENTS

| | | | |
|---|---|---|---|
| 2,121,657 | 6/1938 | Fisher | 251/129 X |
| 2,214,863 | 9/1940 | Schulthesis | 251/120 |
| 2,404,349 | 7/1946 | Brant et al. | 251/86 X |
| 2,735,047 | 2/1956 | Garner et al. | 251/129 X |
| 3,074,685 | 1/1963 | Eckert et al. | 251/86 X |
| 3,471,119 | 10/1969 | Risk | 251/129 X |
| 3,627,257 | 12/1971 | Stampfli | 251/129 |

FOREIGN PATENTS OR APPLICATIONS

542,827  1/1931  Germany ......................... 251/129

*Primary Examiner*—William R. Cline
*Assistant Examiner*—Gerald A. Michalsky
*Attorney, Agent, or Firm*—Michael S. Striker

[57] ABSTRACT

A magnet valve is provided with a valve body having a valve seat, and a spherical valve member which is mounted so that it can move in opposite directions into and out of engagement with the valve seat and has freedom of play transversely of its path of movement. Biasing springs bias the valve member in one of those two directions of movement and an electromagnet is operable for moving the valve member in the opposite direction. A precentering arrangement serves for pre-centering the valve member with reference to the valve seat prior to engagement therewith.

7 Claims, 3 Drawing Figures

MAGNET VALVE

BACKGROUND OF THE INVENTION

The present invention relates generally to a valve, and more particularly to a magnet valve. Still more particularly the invention relates to a magnet valve having a spherical valve member.

Magnet or solenoid valves are so well known that their principle of operation and their basic construction need not be described in detail. However, heretofore these known valves have required a relatively complicated construction of valve member and valve seat and no instance is known in which such a magnet valve has been provided with a valve member in form of a spherical element. Yet, the use of a spherical valve member would be most advantageous for various reasons, not the least of which is that it would permit a simpler construction than those known from the art.

SUMMARY OF THE INVENTION

It is, accordingly, a general object of the present invention to provide an improved magnet valve which has the advantages desired and outlined above, and avoids the disadvantages of the prior art.

More particularly it is an object of the present invention to provide an improved magnet valve utilizing a spherical valve member for cooperation with its valve seat.

Another object of the invention is to provide such a magnet valve in which the spherical valve member will always be able to be precisely seated on the valve seat when it moves into closure position.

In keeping with these objects, and others which will become apparent hereafter, one feature of the invention resides in a magnet valve which, briefly stated, comprises a valve body having a valve seat, and a spherical valve member. Mounting means mounts the valve member for movement in opposite directions into and out of engagement with the valve seat and also permits it freedom of play transversely of the path of movement. Biasing means biases the valve member in one of the directions mentioned above and an electromagnet is provided which is energizable for the purpose of moving the valve member in opposite direction. Finally, I also provide pre-centering means for centering the valve member with reference to the valve seat prior to its engagement therewith.

The use of a spherical valve member as proposed according to the present invention is highly desirable, because such spherical valve members have many advantages. On the one hand they are inexpensive to produce and therefore reduce the manufacturing and ultimately the selling cost. Another advantage is the clean sealing surface which is inherently present on such a spherical valve member. Further advantages of the use of spherical valve members are known to those skilled in the art.

In addition to achieving this particular object of utilizing a spherical valve member, the invention has further advantages, one of which is that it permits compensation for manufacturing inaccuracies resulting from tolerance variations, and affords such compensation in a very simple and inexpensive manner. In addition, the invention of course and primarily provides for a reliable centering of the valve member with reference to the valve seat before it contacts the latter, so that the valve member wil under all circumstances be properly centered relative to the valve seat.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
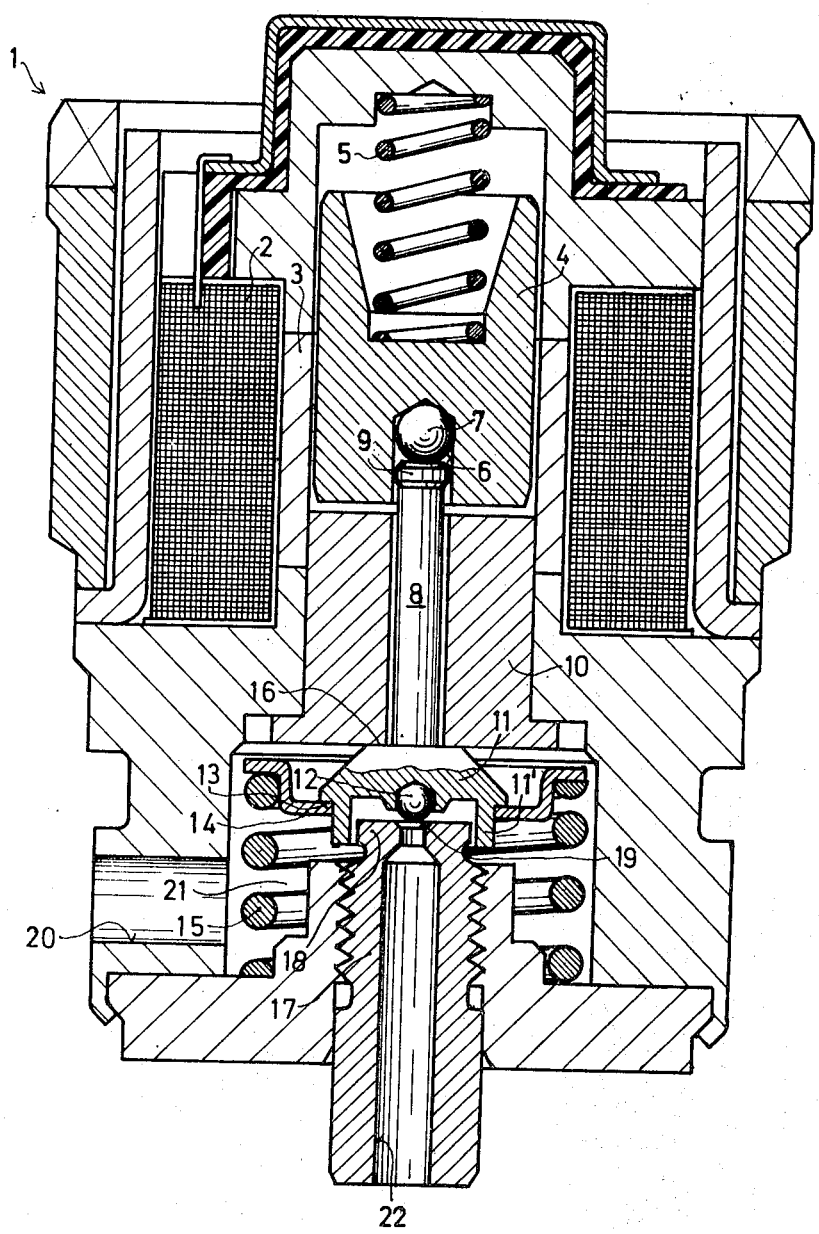
FIG. 1 is an axial section through a magnet valve according to one embodiment of the invention.

Discussing firstly the embodiment illustrated in FIG. 1 it will be seen that reference numeral 1 designates the magnet valve in toto. The magnet valve includes a coil or winding 2 which is mounted on an armature guide tube 3 in the latter of which an armature 4 is movable. The side of the armature 4 which faces upwardly in FIG. 1 is engaged by a spring 5 which is an expansion spring and is weak, at least with reference to the spring 15 which will be discussed later. The opposite side or end of the armature 4 is provided with an axially extending blind bore 6 in which there is accommodated a ball 7 which is clearly located within the confines of the tube 3.

A spherical valve member 12 is provided which is mounted on a valve rod 8 the upper end of which is provided with an enlargment 9 which is accommodated in the axial bore 6 and abuts the ball 7. A sleeve 10 surrounds the valve rod 8, permitting the latter radial play and closing the end of the guide tube 3 which is the lower end in FIG. 1.

At its upper end the valve rod 8 is formed with the enlargement 9 mentioned above. The other or lower end of the valve rod 8 is provided with a cupped portion 11 in the interior of which the valve member 12 is located, being mounted in the bottom wall of the cupped portion 11 so that it cannot become separated therefrom. The portion 11 has a downwardly directed shoulder 13 which serves as an abutment for a spring washer or plate 14 which is biased upwardly by the spring 15, the latter being stronger than the spring 5 as mentioned before. The spring 15 bears upon the plate 14 and upon a closure element holding a valve body 17 which is threaded into the closure element; inasmuch as the spring 15 biases the plate 14 upwardly, it also biases the portion 11 in the same direction until the portion 11 contacts with its shoulder 16, an abutment provided for this purpose on the sleeve 10 as illustrated.

The valve body 17 itself is of hollow cylindrical configuration and provided at its upper end with a guide projection 18 which in the embodiment of FIG. 1 is surrounded by a lower edge portion 11' of the cupped portion 11. The valve seat 19 of the magnet valve 1 is provided on the projection 18 as illustrated and is thus surrounded by the edge portion 11'.

The valve further has a passage 20 which in the illustrated embodiment is an inlet passage and communicates with a space 21 in which the spring 15 and the portion 11 are located. A second passage 22, in the illustrated embodiment an outlet passage, is provided in form of an axial bore in the valve body 17.

FIG. 1 shows the magnet valve 1 in open position in which the electromagnet is not energized. This means that fluid can flow without hindrance from the inlet passage 20 into the outlet passage 22 because the valve member 12 is out of engagement with the valve seat 19. If, however, the winding 2 is energized then the armature 4 is attracted and urged in downward direction counter to the biasing force of the spring 15. This compresses the spring 15 in axial direction, displacing the valve rod 8 with its cupped portion 11 in downward direction and causing the spherical valve member 12 to move into engagement with the valve seat 19. During this movement the edge portion 11' assures that the valve member 12 will be pre-centered precisely with reference to the valve seat 19 before it contacts the latter.

It should be noted that the engagement of the upper end portion 9 of the valve rod 8 with the ball 7 in the illustrated and described manner assures that the valve rod 8 has freedom of radial play which, of course, is true also of the valve member 12 which moves with the valve rod 8. Due to this freedom, limited of course by the edge portion 11' of the cupped portion 11, the valve according to the present invention is able to automatically compensate for tolerance variations or manufacturing inaccuracies, such as for instance a lack of alignment of the longitudinal axes of the various valve components.

Figure 2:
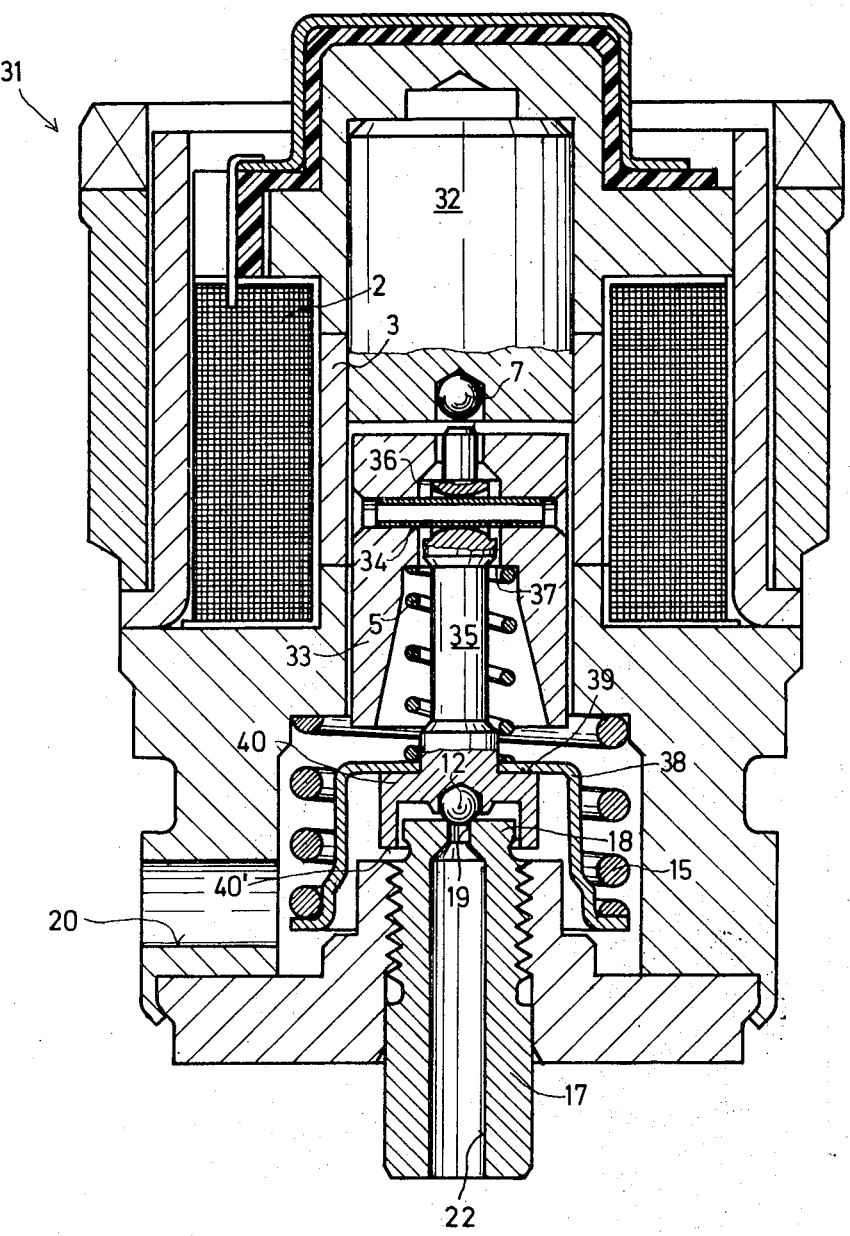
FIG. 2 is a view similar to FIG. 1 but illustrating a further embodiment of the invention.

The embodiment of FIG. 2 is largely similar to that of FIG. 1, the magnet valve being here designated with reference numeral 31. Unlike the embodiment of FIG. 1, that of FIG. 2 is an outlet valve which is closed when the coil is not energized. It should be noted that in FIG. 2 like reference numeral identify the same elements as in FIG. 1.

The embodiment of FIG. 2 also has the armature guiding tube 3. Here, however, an insert 32 is partly located in the tube 3 and it is the insert 32 which accommodates the ball 7 in an axial blind bore. The armature 33 is also in part located in he guide tube 3 and in this embodiment the armature is provided with a diametral bore through which there extends a hollow pin 34. Mounted on the hollow pin 34 is a valve rod 35 which for this purpose is provided with a bore 36 through which the pin 34 extends. Evidently, the valve rod 35 can pivot about the pin 34 in a plane normal to the plane of FIG. 2. To assure that it can also pivot to some extent in the plane of FIG. 2, the opposite outer ends of the bore 36 provided in the valve rod 35 taper continuously in outward direction as illustrated. Thus, the valve rod 35 has freedom of movement in the indicated direction.

The spring 5 is again provided in this embodiment, except that here it is located between and bears upon a shoulder 37 of the armature 33 and a spring plate 38. The stronger spring 15 bears against the same side of the spring plate 38 as does the spring 5, except that it bears upon the radial outward flange at the end of the cupped spring plate, and in addition the spring 15 bears upon an abutment provided for this purpose in a housing portion of the valve 31.

The valve rod 35 extends through an opening provided for this purpose in the spring plate 38 and is provided within the cupped interior of the latter with a cupped portion 40 corresponding to the portion 11 of FIG. 1. The cupped portion 40 has a shoulder 39 which abuts against the inner side of the transverse wall of the spring plate 38, and located within the cupped portion 40 is the spherical valve member 12 which cooperates with the valve seat 19. The valve member 12 is again secured in the cupped portion 40 in such a manner that it cannot become separated therefrom. A circumferential margin 40' of the circumferential wall of the cupped portion 40 surrounds the guide projection 18 of the valve body 17 exteriorly.

FIG. 2 shows the valve 31 in non-energized condition of the winding 2, that is in closed condition. When the winding 2 is energized the armature 33 is displaced in upward direction of FIG. 2, axially compressing the spring 15 due to the fact that the armature 33 draws the valve rod, the cupped portion 40 and the spring plate 38 in upward direction. This causes the valve member 12 to move out of engagement with the valve seat 19. If subsequently the coil 2 is de-energized, then the spring 15 moves the valve rod 35 and the associated valve member 12 in downward direction until the valve member 12 is back in engagement with the valve seat 19. During such movement the margin 40' of the cupped portion 40 assures that the valve member 12 is pre-centered with reference to the valve seat, due to the fact that the portion 40' embraces the portion 18 of the valve body 17. The manner in which the valve rod 35 is mounted on the armature 33 assures the freedom of play and movement of the valve rod 35 and therefore provides for the desired compensation for tolerance variations and other manufacturing problems.

Figure 3:
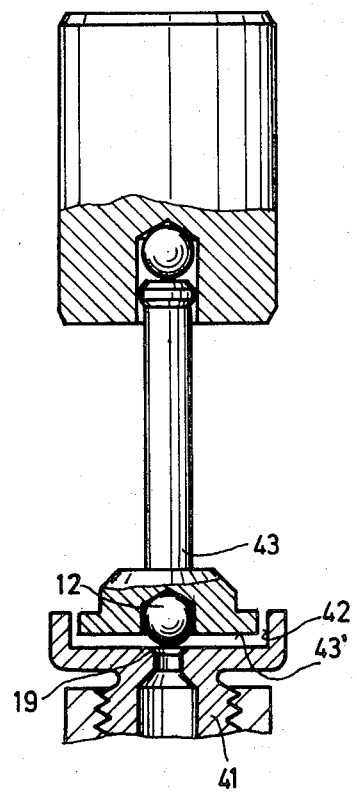
FIG. 3 is a partially sectioned fragmentary detail view illustrating a further embodiment of the invention.

Coming to FIG. 3, finally, it will be seen that here only those details of a third embodiment have been illustrated which are necessary for an understanding of that embodiment. All other components have been omitted, it being understood that they can be the same as in the preceding embodiments.

In FIG. 3 the valve body is designated with reference numeral 41 having a projecting portion which is formed with the valve seat 19. Unlike the preceding embodiments, however, the embodiment of FIG. 3 has a cupped portion 42 provided on the upper projecting portion of the valve body 41 itself, this cupped portion surrounding the valve seat 19 with radial spacing.

A valve rod 43 is provided, bearing against a ball such as the ball 7 of FIGS. 1 and 2, and having a lower end 43' on which again the valve member 12 is mounted in such a manner that it cannot become separated. The portion 43' of the valve rod 43 is configurated as a guide portion whose function is the same as that of the guide portions 18 of FIGS. 1 and 2.

It is clear that in this embodiment the arrangement of the pre-centering means, namely of the cupped portion 42, is reversed with respect to the embodiments of FIGS. 1 and 3. Equally clearly, the valve member 12 will be pre-centered with reference to the valve seat 19 as it moves towards the same and before it contacts the valve seat. Thus, the embodiment of FIG. 3 achieves the same advantages as those of FIGS. 1 and 2.

It will be understood that each of the elements described above, or two or more together, may also find a useful application in other types of constructions differing from the types described above.

While the invention has been illustrated and described as embodied in a magnet valve, it is not intended to be limited to the details shown, since various modifications and structural changes may be made without departing in any way from the spirit and basic concept of the present invention.

Without further analysis, the foregoing will so fully reveal the gist of the present invention that others can by applying current knowledge readily adapt it for various applications without omitting essential features of the generic or specific aspects of this invention and, therefore, such adaptations and modifications should and are intended to be comprehended within the meaning and range of equivalence of the following claims.

What is claimed as new and desired to be protected by Letters Patent is set forth in the appended claims:

1. A magnet valve, comprising a valve body having a projecting portion provided with a valve seat; a valve member having spaced end portions; a spherical member rigidly connected to one of said end portions; a tubular guide; mounting means for mounting said valve member for movement in opposite directions with attendant movement of said spherical member into and out of engagement with said valve seat, and also with freedom of play transversely of the path of movement and including a spherical element located within the confines of said tubular guide, the other of said end portions of said valve member being in pivotable contact with said spherical element so that said valve member has limited freedom of pivoting relative to said tubular guide; biasing means for biasing said valve member in one of said directions; an electromagnet energizable for moving said valve member in the opposite one of said directions and having a coil and an armature connected to said valve member and at least partially surrounded and guided by said tubular member and movable relative to said coil when the latter is energized; and pre-centering means for centering said valve member with reference to said valve seat prior to engagement of said spherical member therewith and including a cupped guide portion provided on said one end portion and having an inner transverse wall carrying said spherical member and a circumferential wall which overlaps and surrounds said projecting portion.

2. A magnet valve, comprising a valve body having a projecting portion provided with a valve seat; a valve member having spaced end portions; a spherical member rigidly connected to one of said end portions; a tubular guide; mounting means for mounting said valve member for movement in opposite directions with attendant movement of said spherical member into and out of engagement with said valve seat; and also with freedom of play transversely of the path of movement and including a spherical element located within the confines of said tubular guide, the other of said end portions of said valve member being in pivotable contact with said spherical element so that said valve member has limited freedom of pivoting relative to said tubular guide; biasing means for biasing said valve member in one of said directions; an electromagnet energizable for moving said valve member in the opposite one of said directions and having a coil and an armature connected to said valve member and at least partially surrounded and guided by said tubular member and movable relative to said coil when the latter is energized; and pre-centering means for centering said valve member with reference to said valve seat prior to engagement of said spherical member therewith and including a cupped guide portion provided on one of said one end portion and said projecting portion and having a circumferential wall closely surrounding the other of said projection portion and said one end portion.

3. A magnet valve, comprising a valve body having a projecting portion provided with a valve seat; an elongated valve member having spaced end portions; mounting means for mounting said valve member for movement in opposite directions and with freedom of play transversely thereof; a spherical member rigidly connected to one of said end portions of said valve member; actuating means for said valve member and including biasing means biasing said valve member in one of said directions and an electromagnet energizable for moving said valve member in the opposite one of said directions with attendant movement of said spherical member into and out of engagement with said valve seat; and precentering means including a cupped guide portion provided on said one end portion of said valve member and having a circumferential wall overlapping and surrounding said projecting portion of said valve body and cooperating therewith so as to center said valve member with respect to said projecting portion and said spherical member with respect to said valve seat prior to engagement therewith.

4. A magnet valve, comprising a valve body having a projecting portion provided with a valve seat; an elongated valve member having spaced end portions; mounting means for mounting said valve member for movement in opposite directions and with freedom of play transversely thereof; a spherical member rigidly connected to one of said end portions of said valve member; actuating means for said valve member and including biasing means biasing said valve member in one of said directions and an electromagnet energizable for moving said valve member in the opposite one of said directions with attendant movement of said spherical member into and out of engagement with said valve seat; and pre-centering means including a cupped guide portion provided on one of said one end portion of said valve member and said projecting portion of said valve body and having a circumferential wall overlapping and surrounding the other of said projecting portion of said valve body and said one end portion of said valve member and cooperating therewith so as to center said valve member with respect to said projecting portion and said spherical member with respect to said valve seat prior to engagement therewith.

5. A magnet valve as defined in claim 4, said electromagnet having a coil and an armature movable relative to the coil when the latter is energized, and wherein said armature is connected with said valve member.

6. A magnet valve as defined in claim 5; further comprising a tubular guide at least partly surrounding said armature for guiding the same during movement thereof.

7. A magnet valve as defined in claim 6, said mounting means including a spherical element located within the confines of said tubular guide; and said valve member having one end portion attached to said spherical member and an other end portion in pivotable contact with said spherical element so that said valve member has limited freedom of pivoting relative to said tubular guide.

* * * * *